US009335756B2

(12) United States Patent
Wender et al.

(10) Patent No.: US 9,335,756 B2
(45) Date of Patent: May 10, 2016

(54) METHOD FOR THE EFFICIENT PROTECTION OF SAFETY-CRITICAL FUNCTIONS OF A CONTROLLER AND A CONTROLLER

(71) Applicant: Audi AG, Ingolstadt (DE)

(72) Inventors: Stefan Wender, Ingolstadt (DE); Alexander Kleinsorge, Berlin (DE)

(73) Assignee: AUDI AG, Ingolstadt (DE)

( * ) Notice: Subject to any disclaimer, the term of this patent is extended or adjusted under 35 U.S.C. 154(b) by 462 days.

(21) Appl. No.: 13/954,471

(22) Filed: Jul. 30, 2013

(65) Prior Publication Data

US 2014/0039649 A1     Feb. 6, 2014

(30) Foreign Application Priority Data

Jul. 31, 2012   (DE) .......................... 10 2012 015 272

(51) Int. Cl.
*G05B 19/406*     (2006.01)
*B60W 50/023*    (2012.01)
*G05B 9/03*        (2006.01)

(52) U.S. Cl.
CPC ........... *G05B 19/406* (2013.01); *B60W 50/023* (2013.01); *G05B 9/03* (2013.01); *G05B 2219/24182* (2013.01); *G05B 2219/24192* (2013.01)

(58) Field of Classification Search
CPC ............ G05B 19/406; G05B 19/4061; B60W 50/023; B60W 50/02
See application file for complete search history.

(56) References Cited

U.S. PATENT DOCUMENTS

| 6,917,305 B2 * | 7/2005 | King ..................... B60R 21/013 340/435 |
| 7,388,475 B2 * | 6/2008 | Litkouhi ............ B60G 17/0195 340/425.5 |
| 7,475,052 B2 * | 1/2009 | Ide ....................... G05B 23/024 706/52 |
| 2008/0133176 A1 | 6/2008 | Kashio et al. |
| 2011/0301720 A1 | 12/2011 | Ehrhart et al. |

FOREIGN PATENT DOCUMENTS

| CN | 1184889 | 6/1998 |
| CN | 102176114 | 9/2011 |
| CN | 102292679 | 12/2011 |
| CN | 102354139 | 2/2012 |
| CN | 102591318 | 7/2012 |
| DE | 100 07 008 A1 | 9/2001 |
| DE | 102 39 026 | 3/2004 |
| DE | 10 2006 008 958 A1 | 9/2006 |
| DE | 102008060011 | 5/2010 |
| DE | 10 2009 054 106 A1 | 5/2011 |

OTHER PUBLICATIONS

Chinese Search Report issued on Sep. 6, 2015 with respect to counterpart Chinese patent application 201310323814.

(Continued)

*Primary Examiner* — Michael Maskulinski
(74) *Attorney, Agent, or Firm* — Henry M. Feiereisen LLC.

(57) ABSTRACT

In a method for operating a controller, at least one input data are processed into at least one output data by using an algorithm. For checking the output data, a second determination of the output data is performed only for output data in a group that does not contain all possible output data.

17 Claims, 2 Drawing Sheets

(56) References Cited

OTHER PUBLICATIONS

Ross Bannatyne—Institute of Electrical and Electronics Engineers: "Highly Dependent Electronics Systems for Automotive Controls", Bd. 2, May 6, 2002, pp. 665-669, XP001214374, ISBN: 978-0-7803-7484-3.

European Search Report with respect to counterpart European patent application EP 13 00 3139.

Translation of European Search Report with respect to counterpart European patent application EP 13 00 3139.

Chinese Search Report issued on Sep. 6, 2015 with respect to counterpart Chinese patent application 201310323814.4.

Translation of Chinese Search Report issued on Sep. 6, 2015 with respect to counterpart Chinese patent application 201310323814.4.

* cited by examiner

METHOD FOR THE EFFICIENT PROTECTION OF SAFETY-CRITICAL FUNCTIONS OF A CONTROLLER AND A CONTROLLER

CROSS-REFERENCES TO RELATED APPLICATIONS

This application claims the priority of German Patent Application, Serial No. 10 2012 015 272.8, filed Jul. 31, 2012, pursuant to 35 U.S.C. 119(a)-(d), the content of which is incorporated herein by reference in its entirety as if fully set forth herein.

BACKGROUND OF THE INVENTION

The present invention relates to a method for operating a controller processing at least one input data into at least one output data with an algorithm.

The following discussion of related art is provided to assist the reader in understanding the advantages of the invention, and is not to be construed as an admission that this related art is prior art to this invention.

Controllers are widely known in the art, for example in terrestrial vehicles and/or aircrafts, but also in medical technology. Such controllers are normally associated with specific functions and process input data, such as sensor signals and/or processed sensor data, into output data with an algorithm, wherein the output data are used for other control purposes, and are transmitted, for example, via a bus to an actuator, directly causing an intervention in a vehicle, for example a braking intervention or like, and/or can be further processed by intermediate controllers in order to determine the need for an intervention, i.e. a control command to an actuator.

Controllers are often used for safety-critical information, for example in motor vehicles as controllers of safety systems and autonomous or semiautonomous driver assistance systems. Safety-critical functions are functions that endanger to a (considerable) extent the overall safety of the device in which the controller is provided, for example a motor vehicle. Therefore, standards exist to meet safety and plausibility requirements of the output data of the controllers. For example, the ISO 26262 standard ("road vehicles—functional safety") was created for motor vehicles, representing an ISO standard for safety-related electrical and/or electronic systems in motor vehicles. The functional safety of a system with controllers of the inventive type should be guaranteed by implementing the standard.

It is known in the prior art to use test purposes for safety-critical functions in controllers to detect errors in the determination of the output data prior to their possibly defective re-utilization. These measures are usually intended to recognize random errors, such as "single-bit errors" (SBE) or "single event upsets" (SEU), and to thus prevent safety-critical situations in the event of an error. For example, electronic failures should be prevented in an automatic emergency braking system from triggering unnecessary emergency braking.

Specifically, it is known to implement the employed hardware and/or the employed software twice at critical points (e.g. lockstep) so as to be able to recognize electronic errors by redundant computation. For example, it has been proposed to provide at least one additional processor which likewise determines the at least one output data, in particular with a slight delay, optionally by using a different algorithm, and invisible to the user. When the output data do not match, an error is assumed. Test measures may also include cyclic self-tests of the involved hardware components, and the like.

All of these measures known in the prior art are very resource-intensive at the software level and/or the hardware level, which raises the cost of the controller and lowers the performance of the controller, in particular because more heat is dissipated and a the energy demand is higher due to the additional operating hardware components and additional computation steps. These disadvantages become very pronounced in image-processing controllers. For example, when specific patterns, for example a person, are to be found in images from a camera, a very complex computation process arises, which is frequently divided into a plurality of so-called hypotheses, for example, what is the probability that a person of a certain size is in a specific image area and the like. Because such controllers must be compact, a very large computing power must be implemented in a very small space, ideally with purely passive cooling. Such image-processing controllers are used for example in motor vehicles for evaluating data from a camera recording the area in front of the vehicle.

It would therefore be desirable and advantageous to obviate prior art shortcomings and to provide an improved operating mode for controllers, which can increase the energy efficiency and performance of the controller while maintaining the necessary safety requirements and/or which reduces the costs of the controller.

SUMMARY OF THE INVENTION

According to one aspect of the present invention, a method for operating a controller includes processing input data into output data in a first determination of the output data by using a first algorithm, determining a first group of the output data that does not contain all possible output data, performing a first check as to whether output data determined in the first determination is contained in the first group, and performing a second determination of the output data to perform a second check of the output data only for those output data contained in the first group.

The invention is based on the realization that many controllers actually rarely compute safety-critical output data relative to their total running time, especially output data that describe an intervention by an actuator and/or causes an intervention by an actuator. In other words, this means that most of the controllers seldom reach the conclusion that a safety-critical intervention is required. Examples are automatic brake intervention, collision warnings, steering interventions for evasive maneuvers, airbag triggering, and the like. For example, when an image processing controller checks, whether a person is in a critical area in front of a motor vehicle, and whether an emergency stop is therefore necessary, such an event occurs extremely rarely. Otherwise, the output data of the controller will describe a situation in which no intervention is required.

According to the present invention, instead of redundantly performing all computations during the entire run time, to limit the additional, second determination of the output data to the particular group of output data that are safety-critical. For example, when the actual, first determination of the output data would directly or indirectly cause an intervention by an actuator, a second, redundant determination is performed to check the output data and thus secure the intervention to be performed.

In contrast to so-called "dual modular redundant" systems, results from second units/computations are needed only for the (typically rare) action/intervention, i.e. for safety-critical output data. Verification is performed where appropriate, i.e. output data from the first group (safety-critical output data) are assumed to have an error and are checked. This procedure is especially useful in systems where a phantom (false-positive detection) represents a significantly greater risk than non-detection (false-negative).

Consequently, the energy efficiency of the controller can be increased because far fewer computations need to be performed since safety critical output data, i.e. data of the first group of output data, occur far less frequently than other output data which can be grouped in a second group of output data that has no common data with the first group of output data. A redundant second determination is not performed for all output data of the second group which occur very frequently. This reduces also the heat dissipated from the controller and ideally fewer hardware components are required so that the weight of the controller can be reduced. Furthermore, the costs of the various components of the controller can also be reduced, because less total power is required. The utilization of the controller is significantly reduced.

The advantages of the present invention are particularly evident, when the operating method is used for an image-processing controller and/or for a controller of a motor vehicle. For example, when images from a camera aimed in front of the vehicle are evaluated by an image processing controller of a motor vehicle, a high computational complexity exists, wherein a very large proportion of, for example, the tested hypotheses will lead to the conclusion that no danger/threat situation exists. However, when all these computations are performed redundantly ultimately, i.e. twice, a massive number of computations are produced, which can be significantly reduced within the context of the present invention, because safety-critical results or output data of the algorithms are extremely rare, so that only a very small portion of the computations actually needs to be checked in a second determination. The required computing power can thus be halved and the energy efficiency in image processing controllers can be improved accordingly, which is deemed to be particularly advantageous. In addition, a significant improvement is attained in motor vehicles because an extremely compact, energy efficient construction requiring little cooling is required and preferred. In principle, however, the inventive method can also be used with controllers of other devices, i.e. not only in other vehicles such as aircrafts, but also for example in the medical field, which frequently requires image processing, for example in the field of fluoroscopy.

According to an advantageous feature of the present invention, the output data of the first group may be output data describing and/or causing an intervention by an actuator and/or safety-critical output data. In particular, a check may always be carried out when an acting component, i.e. an actuator, is actually controlled or, in general, when safety-critical output data are received, i.e. just in those situations where it is essential. Thus, false alarms and the like, that would cast doubt on the overall system for the user, such as in an emergency braking system, are largely avoided with the inventive method, whereas a check will be omitted in non-safety-critical situations, i.e. where there is no risk of false triggering.

Several options are possible for the second determination, which ultimately represents a redundant computation and allow a meaningful check. For example, the second determination of the output data may be advantageously performed using the same hardware, but a different algorithm. In this case, a second algorithm which is also suitable for determining the output data is stored, in particular in a storage device. When output data of the first group occur, and only then, is the second algorithm used to enable a second determination of the output data and a corresponding check. These different paths should produce the same result, resulting in a meaningful check.

According to another advantageous feature of the present invention, at least one redundant hardware component, in particular an additional processor, may be used for the second determination of the output data. However, a further, second algorithm may also be used. In this way, processor errors that manifest themselves identically in the result can be detected. The use of additional processors is advantageous, for example, when a multi-core multi-processor environment with several processors is used, for example, a dual-core, a quad-core or a tri-core environment. The computations that resulted in the output data of the first group can then be specifically assigned to another processor.

According to another advantageous feature of the present invention, a self test of at least one hardware component participating in the first and/or second determination may be performed after the check and prior to the second determination. The results of such a self-test, which is already known in the prior art for most hardware components, may be taken into account when checking the output data. Such self-tests can be performed very quickly, for example within a microsecond, and can be added accordingly.

According to another advantageous feature of the present invention, the integrity of the algorithm stored in a storage device and/or of the at least one input data stored in a storage device may be checked after the check and prior to the second determination. Alternatively, it may be checked whether an error in the data has occurred, for example due to an error in the storage device, in particular in the data relating to the algorithm, in particular to the software and/or to the input data. For this purpose, a check value may be used to check the data integrity and/or a CRC process and/or ECC process may be used. Check values, particularly check sums, are well known in the art and can also be used in this case to check the data integrity. The cyclic redundancy check (CRC) is a common procedure that determines a check value for data to detect errors during transmission or storage. Error-correcting-code (ECC memory is a known type of memory that can detect and also correct internal data corruption. Single bit errors can here be detected and corrected.

According to another advantageous feature of the present invention, a certain latency results before the safety-critical computation is actually checked by initiating the second determination only after it has been determined by the output data that it is necessary. However, the present method may also include options to minimize the latency. For example, in one embodiment, the at least one input data and/or at least an intermediate result may be kept in a storage device for the second determination, in particular until a decision can be made that no second determination is necessary and/or until the conclusion of the check based on the result of the second determination.

According to another advantageous feature of the present invention, input data may be kept in a storage device of the controller at least until is clear whether they are still needed. The data then need not to be newly procured, which may be difficult, but may be directly processed completely anew. This embodiment can advantageously be combined with a check of the data integrity by using suitable methods.

According to another advantageous feature of the present invention, the second determination may be limited to computation processes related to the determination of the output data of the first group. This means that the entire computation on the input data must not necessarily be safety-critical, so that the redundant computation, i.e. the second determination, may be limited to the portion that is in fact safety-critical. In other words, the present invention proposes to perform the second check as partially or reduced as possible by only repeating the computation processes actually responsible for the output data of the first group, thus saving a significant amount of time.

This means in the context of image processing that when the image evaluation is as described divided among individual hypotheses, only the most critical hypothesis needs to be verified, namely the hypothesis that produced the output data and optionally requires intervention. Accordingly, not the complete evaluation of the entire input image is repeated, but ultimately only the crucial hypothesis. In summary, only the confirmed hypothesis producing the output data is checked in a controller configured for image processing and operating with hypotheses.

Additionally, the output data will be used in the method of the invention only when confirmed by a check. This means that the output data is actually used only when both determinations, i.e. computations, produce identical output data, wherein optionally a tolerance range can be specified for continuous values, for example to initiate an intervention of an actuator or the like.

According to another aspect of the present invention, a controller is configured to implement the method according to the invention by using control hardware and control software. All of the above descriptions with respect to the inventive method can likewise be applied to the controller of the invention, which therefore also produces the advantages of the invention.

According to another advantageous feature of the present invention, the controller according to the invention may include at least one processor and at least one storage device, so that the hardware and/or software can be simplified or made more energy-efficient. In particular, in the controller according to the invention may be an image processing controller, which can also be installed in a motor vehicle. The controller according to the invention may form part of a safety system and/or a driver assistance system in a motor vehicle and may be configured to evaluate as input data images from a camera installed in the motor vehicle, for example relating to an imminent collisions and the like.

Thus, in the context of the present invention, a motor vehicle may be provided that includes at least a safety system and/or a driver assistance system and a controller according to the invention assigned to such system. The advantages of the present invention are especially evident in a motor vehicle.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
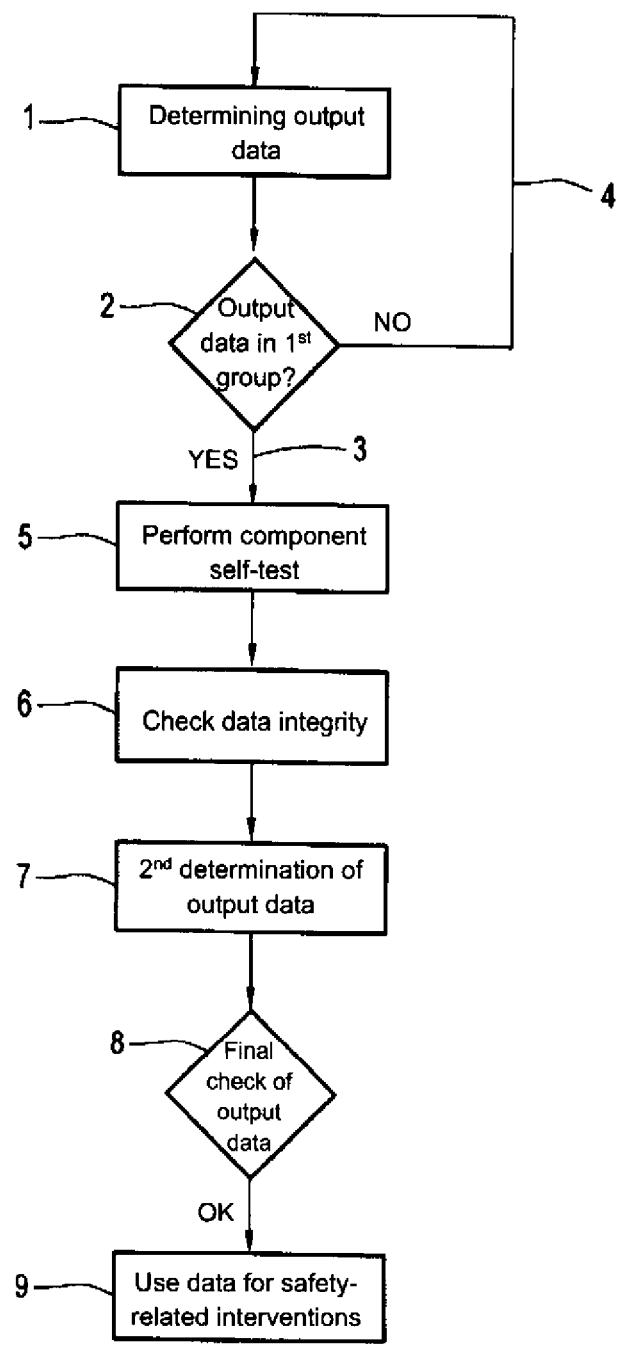
FIG. 1 shows a flow diagram of the method according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic flow diagram of an exemplary embodiment of the present invention, which relates to a method for operating a controller, with the method implemented in the controller itself. Redundant computations for checking output data should always only be performed, when a safety-critical result actually occurs, which is checked based on the association of the at least one output data to a first group of output data that does not contain all possible output data, but only the safety-critical output data that describe an intervention or cause an intervention. The controller described herein as an exemplary embodiment is an image processing controller of a motor vehicle, which is associated with a safety system. For example, the safety system may be a pedestrian protection system, where it is checked whether a pedestrian is seen in a critical position in the images recorded by a camera of the motor vehicle. If this is the case, output data are generated, which may trigger emergency braking and/or a warning as an intervention by an actuator.

Various hypotheses will be tested individually within the context of the image processing, for example, how a person of a certain size is visible in a particular image detail. If particular hypotheses are true, the controller concludes that is an intervention is required. The result of the computations of the controller by the algorithm provided for the image processing is therefore an output data which in most situations will not indicate a danger, which however will represent output data requiring intervention when a pedestrian was detected in a dangerous position.

At step 1 of FIG. 1, an actual output data is determined.

At a step 2 it is checked whether the output data belong to the first group of output data or to a second group of non-safety-critical output data. If the output data belong to the first group, arrow 3, a second determination of the output data is initiated to check the output data. If the output data is not a part of the first group of output data, a new determination of output data with new input data, i.e. with the next image from the camera, is performed by the algorithm, as indicated by the arrow 4.

At step 5, all components of the controller required for the first and second determination now perform a self-test. If an error occurs already at this point, this is an indication of a defective safety-critical output data.

At step 6, the data integrity of all involved data is checked for possible memory errors. It should be noted that both the input data and the optionally required intermediate results are kept in a suitable storage device for as long until it becomes clear that they are no longer needed for a second determination and that the second determination is completed. This data can now be checked, for example, using a checksum or a check value, in particular in a CRC process. The same also applies to the stored software algorithms to be used, i.e. the corresponding code memory in the controller can also be checked. Non-existent data integrity is also a clear indication of a defect in the safety-critical output data.

At step 7, the second determination is performed, for which a plurality of variants are conceivable within the scope of the present invention. For example, in this exemplary embodiment, the same hardware, in particular the same at least one processor may be used, while using a different algorithm from the algorithm used in the first determination of the output data. Alternatively, at least one processor which may be redundant or may not have been involved in the first determination for other reasons, for example in a multi-core system, can be specifically assigned to the second determination. Of course, a different algorithm may here also be used.

In each case, only the part of the computations that actually causes the output data is checked, i.e. the hypothesis that resulted in the output data of the first group. However, if the position or the number of the hypothesis is already known before the actual image is processed as input data, only the computational complexity and/or the computation time for the verification of this one hypothesis is additionally necessary. The second determination will then be limited to the safety-critical part of the last computation processes.

At step 8, criteria are then considered, which represent the final verification of the output data of the first group. These criteria can of course also take into account the results of steps 5 and 6. Only when it is determined that the output data (optionally within a tolerance range) computed in the first and the second determination are identical, the output data according to step 9 are re-used, in particular, by being transmitted to a bus system of the motor vehicle and for example, initiates the intervention by an actuator such as a braking intervention, and/or is further processed by another controller to initiate an intervention.

Figure 2:
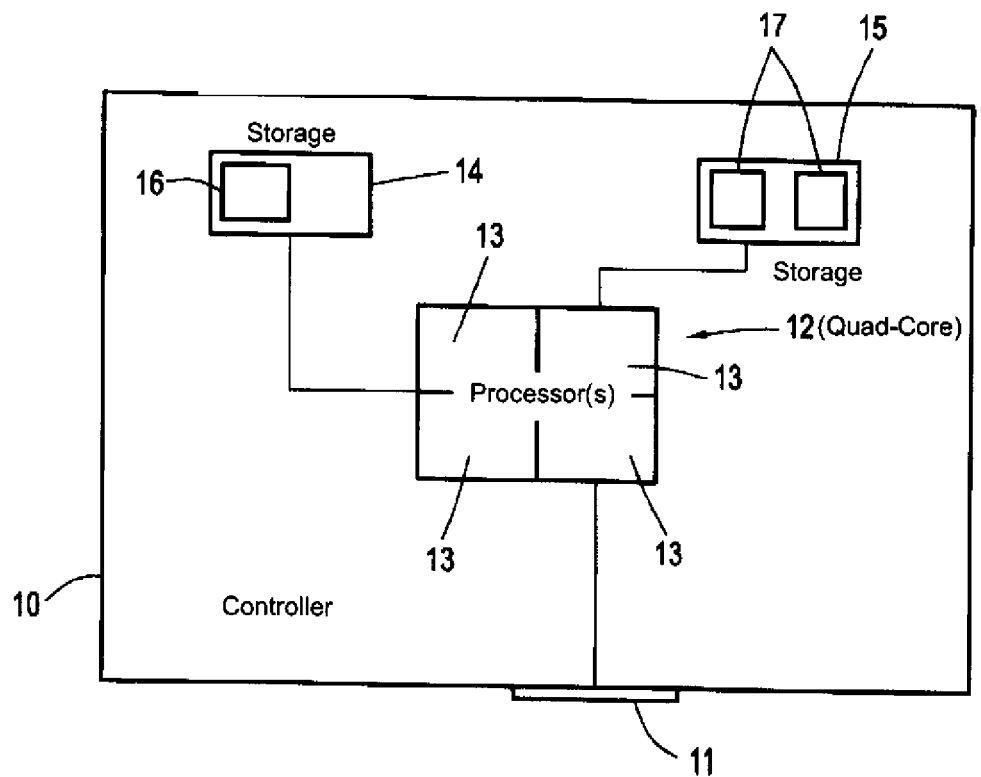
FIG. 2 shows a controller according to the present invention.

FIG. 2 shows a schematic diagram of a controller 10 according to the invention. The controller 10 has, in addition to an interface 11 to a bus system of a motor vehicle, a quad-core 12 with four processors 13. In addition, in the embodiment of FIG. 2, two storage devices 14 and 15 are provided wherein the storage device 14 is used to store data, in particular to store the input data 16. The storage device 15 is a code storage device that stores the algorithms 17 used within the context of determining output data and implementing of the method according to the invention.

The image processing controller 10, which is associated with a safety system of a motor vehicle, is configured by corresponding control hardware and control software to perform the method according to the invention by executing the exemplary embodiment of the inventive method according to FIG. 1.

Figure 3:
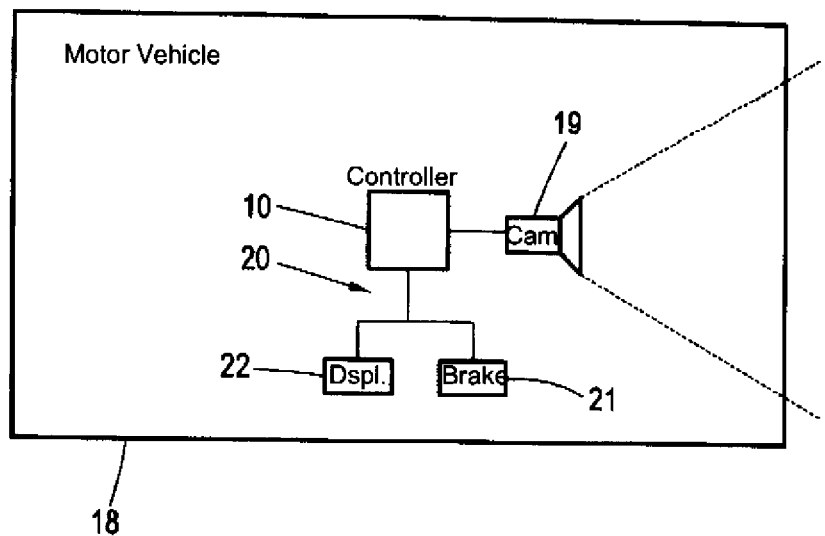
FIG. 3 shows a motor vehicle.

FIG. 3 shows in form of an example of the use of the controller 10 in a motor vehicle 18, where it is associated with a safety system. The motor vehicle 18 has a camera 19 directed to the area in front of the vehicle 18, which transmits its image data to the controller 10 as input data. The controller 10 can communicate with other vehicle systems, especially actuators, via a bus system 20, such as a CAN bus, wherein a brake system 21 and a display device 22 configured to output a warning are shown here by way of example, which represent actuators that can evaluate the output data of the controller 10.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method for operating a controller, comprising
   processing input data into output data in a first determination of the output data by using a first algorithm,
   determining a first group of the output data that does not contain all possible output data,
   performing a first check as to whether output data determined in the first determination is contained in the first group, and
   performing a second determination of the output data to perform a second check of the output data only for those output data contained in the first group.

2. The method of claim 1, wherein the output data contained in the first group describe an intervention by an actuator or cause an intervention by an actuator or are safety-critical output data, or a combination thereof.

3. The method of claim 2, wherein the output data are used only when confirmed by the second check.

4. The method of claim 1, wherein the controller is at least one of an image processing controller and a controller of a motor vehicle.

5. The method of claim 1, wherein the second determination of the output data is performed using identical hardware, but using a second algorithm different from the first algorithm.

6. The method of claim 1, wherein the second determination of the output data is performed using a redundant hardware component.

7. The method of claim 6, wherein the second determination of the output data is performed using an additional processor.

8. The method of claim 7, wherein the data integrity is checked using at least one of a check value, a cyclic redundancy check (CRC) process and an error-correcting-code (ECC) process.

9. The method of claim 1, further comprising performing a self-test of at least one hardware component involved in at least one of the first and second determination, after determining whether output data determined in the first determination is contained in the first group and before the second determination is performed.

10. The method of claim 1, further comprising checking integrity of the algorithm stored in a storage device, after the first check and before the second determination.

11. The method of claim 1, further comprising checking the input data stored in a storage device after the first check and before the second determination.

12. The method of claim 1, further comprising storing at least one input data or at least an intermediate result, or both, in a storage device for the second determination.

13. The method of claim 12, wherein the at least one input data or the at least an intermediate result are stored until a decision is made that the second determination will not be performed.

14. The method of claim 12, wherein the at least one input data or the at least an intermediate result are stored until the second check is concluded.

15. The method of claim 1, wherein the second determination is limited to computing operations related to determining the output data belonging to the first group.

16. The method of claim 15, wherein the controller is configured for image processing and operates using hypotheses, and wherein only a confirmed hypothesis resulting in the output data is checked.

17. A controller comprising control hardware and control software, said controller configured to process input data into output data in a first determination of the output data by using a first algorithm, determine a first group of the output data that does not contain all possible output data, perform a first check as to whether output data determined in the first determination is contained in the first group, and perform a second determination of the output data to perform a second check of the output data only for those output data contained in the first group.

* * * * *